(12) United States Patent
Hiran et al.

(10) Patent No.: US 11,586,597 B2
(45) Date of Patent: Feb. 21, 2023

(54) INTEGRATED SYSTEM FOR ENTITY DEDUPLICATION

(71) Applicant: Freshworks Inc., San Mateo, CA (US)

(72) Inventors: Suvrat Hiran, Bangalore (IN); Srivatsa Narasimha, Bangalore (IN); Bharathi Balasubramaniam, Hyderabad (IN); Swaminathan Padmanabhan, Chennai (IN)

(73) Assignee: Freshworks Inc., San Mateo, CA (US)

( * ) Notice: Subject to any disclaimer, the term of this patent is extended or adjusted under 35 U.S.C. 154(b) by 289 days.

(21) Appl. No.: 16/794,127

(22) Filed: Feb. 18, 2020

(65) Prior Publication Data
US 2021/0256002 A1    Aug. 19, 2021

(51) Int. Cl.
| | |
|---|---|
| G06F 16/215 | (2019.01) |
| G06N 20/00 | (2019.01) |
| G06N 7/00 | (2023.01) |
| G06F 16/248 | (2019.01) |
| G06F 40/40 | (2020.01) |
| G06F 40/284 | (2020.01) |
| G06F 16/2452 | (2019.01) |
| G06Q 10/10 | (2023.01) |

(52) U.S. Cl.
CPC .......... *G06F 16/215* (2019.01); *G06F 16/248* (2019.01); *G06F 16/24526* (2019.01); *G06F 40/284* (2020.01); *G06F 40/40* (2020.01); *G06N 7/005* (2013.01); *G06N 20/00* (2019.01); *G06Q 10/10* (2013.01)

(58) Field of Classification Search
CPC .. G06F 16/215; G06F 16/2452; G06F 16/248; G06F 40/284; G06F 40/40; G06F 16/24; G06F 16/28
See application file for complete search history.

(56) References Cited

U.S. PATENT DOCUMENTS

| | | | |
|---|---|---|---|
| 8,914,338 B1 * | 12/2014 | Wallace | G06F 3/0608 707/693 |
| 10,628,396 B1 * | 4/2020 | Borthwick | G06F 16/215 |
| 10,628,490 B2 * | 4/2020 | Yakout | G06F 16/9024 |
| 10,803,050 B1 * | 10/2020 | Salkola | G06F 16/9038 |

(Continued)

OTHER PUBLICATIONS

Ananthakrishna, Rohit, et al., "Eliminating Fuzzy Duplicates In Data Warehouses", Proceedings of the 28th VLDB Conference, Hong Kong, China, 2002.

(Continued)

*Primary Examiner* — Tarek Chbouki
*Assistant Examiner* — Maher N Algibhah
(74) *Attorney, Agent, or Firm* — LeonardPatel PC; Sheetal S. Patel; Michael A. Leonard, II

(57) ABSTRACT

A computer-implemented method for deduplicating records includes generating a block comprising of a group of records. The method also includes creating one or more record pairs from the block, and calculating one or more features based on one or more fields within the one or more record pairs. The method further includes inputting the one or more features into a machine language trained model to predict a probability score. The probability score indicates whether two records are duplicates. The method also includes storing the probability score as links between two vertices in a graph, and displaying one or more duplicate records by querying the graph.

21 Claims, 8 Drawing Sheets

(56) References Cited

U.S. PATENT DOCUMENTS

| | | | | |
|---|---|---|---|---|
| 10,911,386 | B1* | 2/2021 | Beckman | G06F 16/358 |
| 11,113,254 | B1* | 9/2021 | Borthwick | G06F 16/215 |
| 2005/0066190 | A1* | 3/2005 | Martin | G06F 16/93 |
| | | | | 726/26 |
| 2014/0156606 | A1* | 6/2014 | Beskales | G06F 16/215 |
| | | | | 707/692 |
| 2017/0052958 | A1* | 2/2017 | Manning | G06F 16/35 |
| 2017/0124038 | A1* | 5/2017 | Upadhyay | H04L 51/22 |
| 2019/0034475 | A1* | 1/2019 | Parikh | G06N 20/20 |
| 2019/0287025 | A1* | 9/2019 | Perez | G06N 20/20 |
| 2019/0295200 | A1* | 9/2019 | Girgensohn | G06Q 50/184 |
| 2019/0361842 | A1* | 11/2019 | Wood | H04L 9/0637 |
| 2020/0081997 | A1* | 3/2020 | Rashidi | G06Q 10/02 |
| 2021/0173825 | A1* | 6/2021 | Lu | G06F 16/174 |
| 2021/0224258 | A1* | 7/2021 | Faruquie | G06F 16/2379 |
| 2021/0248193 | A1* | 8/2021 | Cho | G06F 16/906 |

OTHER PUBLICATIONS

Bilenko, Mikhail et al., "Adaptive Duplicate Detection Using Learnable String Similarity Measures", Proceedings of the Ninth ACM SIGKDD International Conference on Knowledge Discovery and Data Mining(KDD-2003), Washington DC, pp. 39-48, Aug. 2003.

Bilenko, Mikhail Yuryevich, "Learnable Similarity Functions and Their Application to Record Linkage and Clustering", Dissertation Presented to the Factulty of the Graduate School of The university of Texas at Austin, Aug. 2006.

Borkar, Vinayak, et al., "Automatic segmentation of text into strucrured records". ACM SIGMOD May 21-24, 2007, Santa Barbara, California, USA.

Goiser, Karl, et al., "Towards Automated Record Linkage", Australian Computer Society, Inc., Proc. Fifth Australasian Data Mining Conference, Sydney, Dec. 2006.

Guo, Songtao, et al., "Record Linkage with Uniqueness Constraints and Erroneous Values", Proceedings of the VLDB Endowment, vol. 3, No. 1, 2010, VLDB Endowment 2150-8097.

Monge, Alvaro, et al., "The Field Matching Problem: Algorithms and Applications", In Proceedings of the Second International Conference on Knowledge Discovery and Data Mining (KDD-96), 1996.

Pershina, Maria, et al., "Holistic Entity Matching Across Knowledge Graphs", https://www.academia.edu/27404789/Holistic_Entity_Matching_Across_Knowledge_Graphs.

Sarawagi, Sunita, et al., "ALIAS: An Active Learning led Interactive Deduplication System", Proceedings of the 28th VLDB Conference, Hong Kong, China, 2002.

Sarawagi, Sunita, et al., "Interactive Deduplication uding Active Learning", Proceedings of the Eighth ACM SIGKDD international conference on Knowledge discovery and data mining (KDD '02). ACM, New York, NY, USA, 269-278.

Winkler, William, E., "Advanced Methods for Record Linkage", Technical report, Statistical Research Division, U.S. Census Bureau, Washington, DC, 1994.

\* cited by examiner

INTEGRATED SYSTEM FOR ENTITY DEDUPLICATION

FIELD

The present invention relates to databases, and more particularly, to deduplication of records in real-time.

BACKGROUND

When searching in a database, there may be several duplications of records or entries. These records may include personal information, company information, institute information, or any type of information that may be duplicated. Thus, a system that finds and removes duplications are needed.

Some systems search for duplications and store the duplications in a graph. However, these systems do not detect duplicate entries in real-time.

Other systems search records with a common token. For each record that has a common token, the system assigns a score based on the importance of the token. These systems, however, do not deduplicate the records. Further, these systems do not use a machine learning model for performing the comparison for duplicate records.

Accordingly, an improved approach for deduplicating records may be beneficial.

SUMMARY

Certain embodiments of the present invention may provide solutions to the problems and needs in the art that have not yet been fully identified, appreciated, or solved by current deduplication technologies. For example, some embodiments of the present invention pertain to deduplicating records in a database in real-time.

In an embodiment, a method includes generating a block comprising of a group of records. The method also includes creating one or more record pairs from the block, and calculating one or more features based on one or more fields within the one or more record pairs. The method further includes inputting the one or more features into a machine language trained model to predict a probability score. The probability score indicates whether two records are duplicates. The method also includes storing the probability score as links between two vertices in a graph, and displaying one or more duplicate records by querying the graph.

A computer program embodied on a non-transitory computer readable medium. The computer program configured to execute a processor to generate a block comprising of a group of records, and create one or more record pairs from the block. The computer program is further configured to execute a processor to calculate one or more features based on one or more fields within the one or more record pairs, and input the one or more features into a machine language trained model to predict a probability score. The probability score indicates whether two records are duplicates. The computer program is further configured to execute a processor to store the probability score as links between two vertices in a graph, and display one or more duplicate records by querying the graph.

A system includes at least one processor and memory comprising a set of instructions. The set of instructions are configured to cause the at least one processor to generate a block comprising of a group of records, and create one or more record pairs from the block. The set of instructions are further configured to cause the at least one processor to calculate one or more features based on one or more fields within the one or more record pairs, and input the one or more features into a machine language trained model to predict a probability score. The probability score indicates whether two records are duplicates. The set of instructions are configured to cause the at least one processor to store the probability score as links between two vertices in a graph, and display one or more duplicate records by querying the graph.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments generally pertain to deduplicating records in a database. In an embodiment, a distributed, horizontally scalable system may search for duplicate records in real-time based on patterns identified from training examples. In some embodiments, when a new record is created, deduplication against all records in the database is performed and results are shown in real-time. The system may shrink the search space required to be examined for identifying duplicates, and may achieve search space compression by building a corpus of tokens from an entity database.

Each token may act as an identifier or an index for a set of records in the database. For a given record, tokens help identify probable duplicate records by performing a significantly reduced number of comparisons. The comparison between two records is performed by using a machine learning (ML) model, e.g., a random forest model. Although a random forest model is described herein, other embodiments may use any statistical method or model. The ML model is pre-trained to identify duplicate records.

A graph of duplicates may then be formed having a multiple vertices and undirected edges. Each vertex is a record, and the undirected edges represent the probability of two records being duplicates of each other, in some embodiments. These duplicates may then be pulled with O(1) search time.

Figure 1:
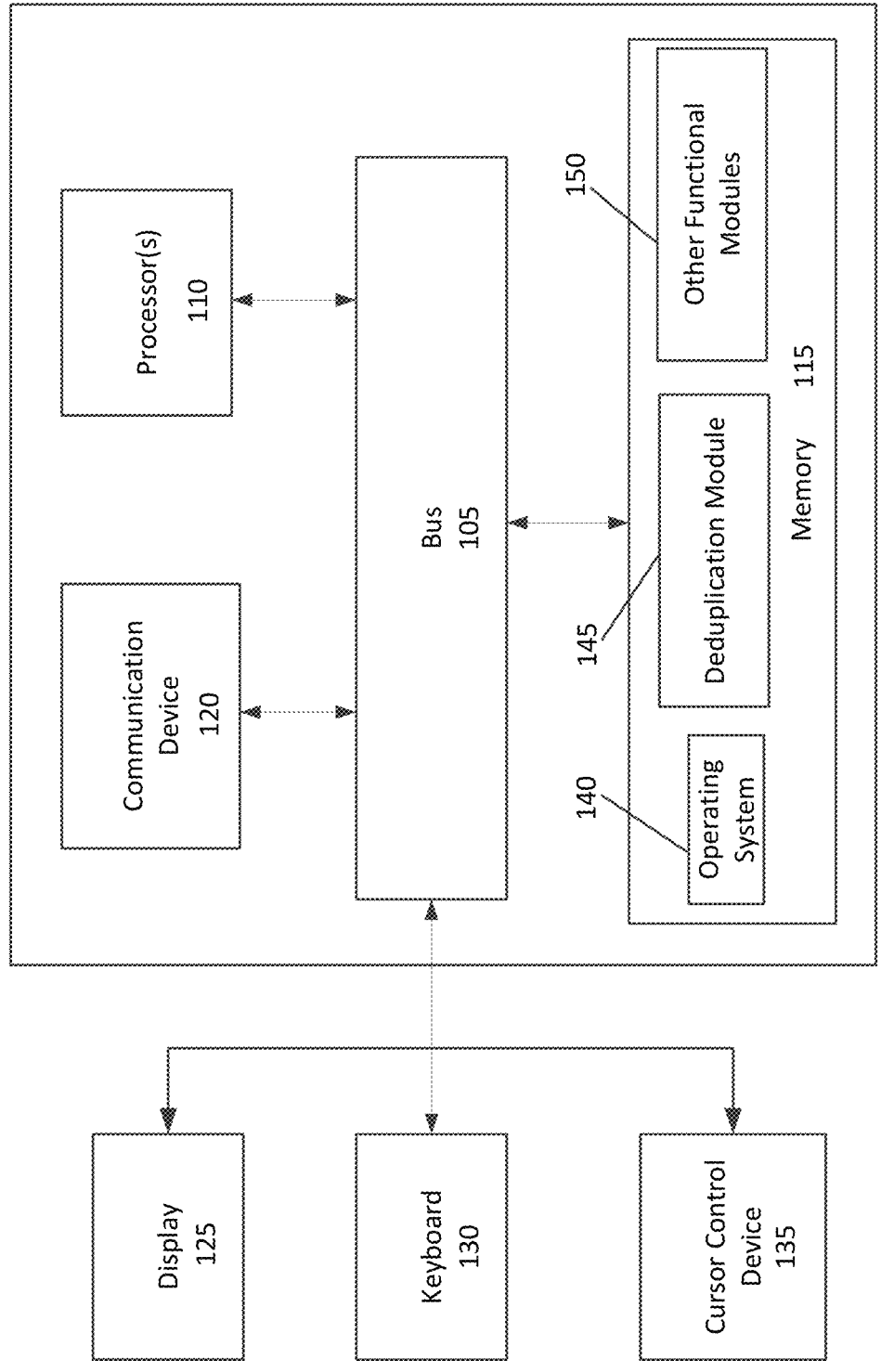
FIG. 1 is an architectural diagram illustrating a computing system configured to deduplicate records in a database, according to an embodiment of the present invention.

FIG. 1 is an architectural diagram illustrating a computing system 100 configured to deduplicate records in a database, according to an embodiment of the present invention. In some embodiments, computing system 100 may be one or more of the computing systems depicted and/or described herein. Computing system 100 includes a bus 105 or other communication mechanism for communicating information, and processor(s) 110 coupled to bus 105 for processing information. Processor(s) 110 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 110 may also have multiple processing cores, and at least some of the cores may be configured to perform specific functions. Multi-parallel processing may be used in some embodiments. In certain embodiments, at least one of processor(s) 110 may be a neuromorphic circuit that includes processing elements that mimic biological neurons. In some embodiments, neuromorphic circuits may not require the typical components of a Von Neumann computing architecture.

Computing system 100 further includes a memory 115 for storing information and instructions to be executed by processor(s) 110. Memory 115 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 110 and may include volatile media, non-volatile media, or both. The media may also be removable, non-removable, or both.

Additionally, computing system 100 includes a communication device 120, such as a transceiver, to provide access to a communications network via a wireless and/or wired connection. In some embodiments, communication device 120 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideB and (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 120 may include one or more antennas that are singular, arrayed, phased, switched, beamforming, beam steering, a combination thereof, and or any other antenna configuration without deviating from the scope of the invention.

Processor(s) 110 are further coupled via bus 105 to a display 125, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 125 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 130 and a cursor control device 135, such as a computer mouse, a touchpad, etc. are further coupled to bus 105 to enable a user to interface with the computing system. However, in certain embodiments, a physical keyboard and mouse may not be present, and the user may interact with the device solely through display 125 and/or a touchpad (not shown). Any type and combination of input devices may be used as a matter of design choice. In certain embodiments, no physical input device and/or display is present. For instance, the user may interact with computing system 100 remotely via another computing system in communication therewith, or computing system 100 may operate autonomously.

Memory 115 stores software modules that provide functionality when executed by processor(s) 110. The modules include an operating system 140 for computing system 100. The modules further include a deduplication module 145 that is configured to perform all, or part of, the processes described herein or derivatives thereof. Computing system 100 may include one or more additional functional modules 150 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions which may, for instance, be organized as an object, procedure, or function. Nevertheless, the executables of an identified module need not be physically located together, but may include disparate instructions stored in different locations which, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
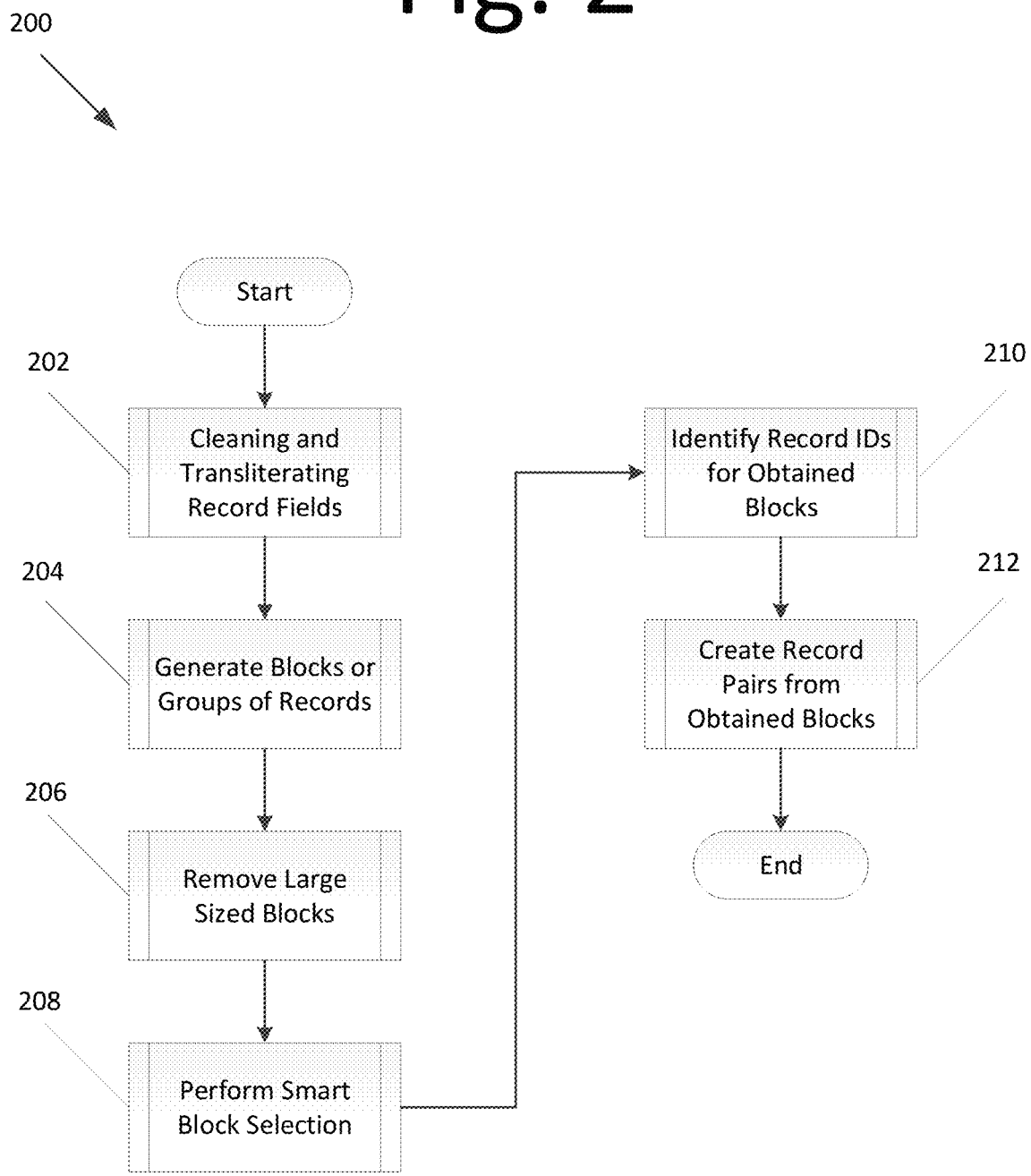
FIG. 2 is a flow diagram illustrating a method for creating record pairs, according to an embodiment of the present invention.

FIG. 2 is a flow diagram illustrating a method 200 for creating record pairs, according to an embodiment of the present invention. In an embodiment, method 200 may begin at 202 with the computing system cleaning record fields and transliterating the record fields to have an accurate comparison for deduplication. At 204, the computing system generates blocks (or groups of records) based on one or more tokens present in the record fields to decrease the search space when searching for duplications. At 206, the computing system removes large sized blocks based on common tokens. At 208, the computing system performs smart block selection, i.e., obtain blocks that have a high possibility of genuine duplicate record pairs. At 210, identify the record identifications (IDs) for the obtained blocks, and at 212, create record pairs from the obtained blocks.

Figure 3:
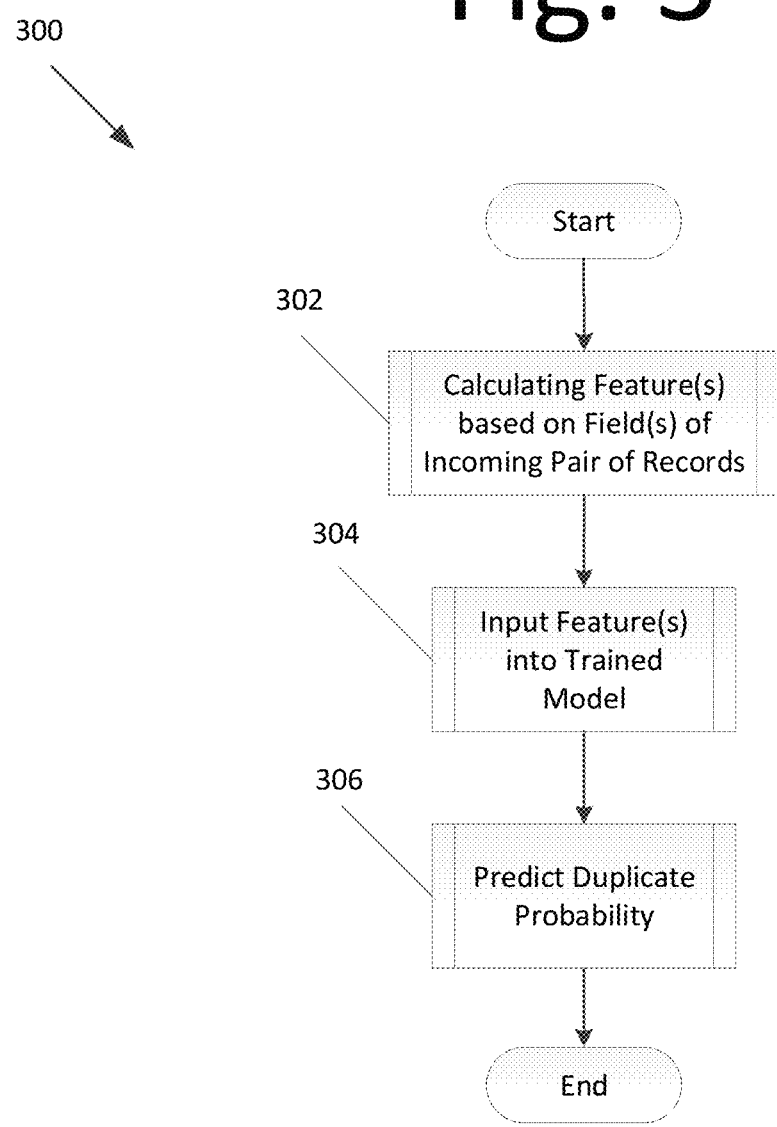
FIG. 3 is a flow diagram illustrating a method for predicting a duplicate probability score, according to an embodiment of the present invention.

FIG. 3 is a flow diagram illustrating a method 300 for predicting a duplicate probability score, according to an embodiment of the present invention. In an embodiment, method 300 may begin at 302 with the computing system calculating one or more features based on one or more fields of an incoming pair of records. At 304, the computing system inputs the one or more features into a trained ML model, and at 306, from the trained model, the computing system predicts the duplicate probability score. This probability score depicts whether two records are duplications.

Figure 4:
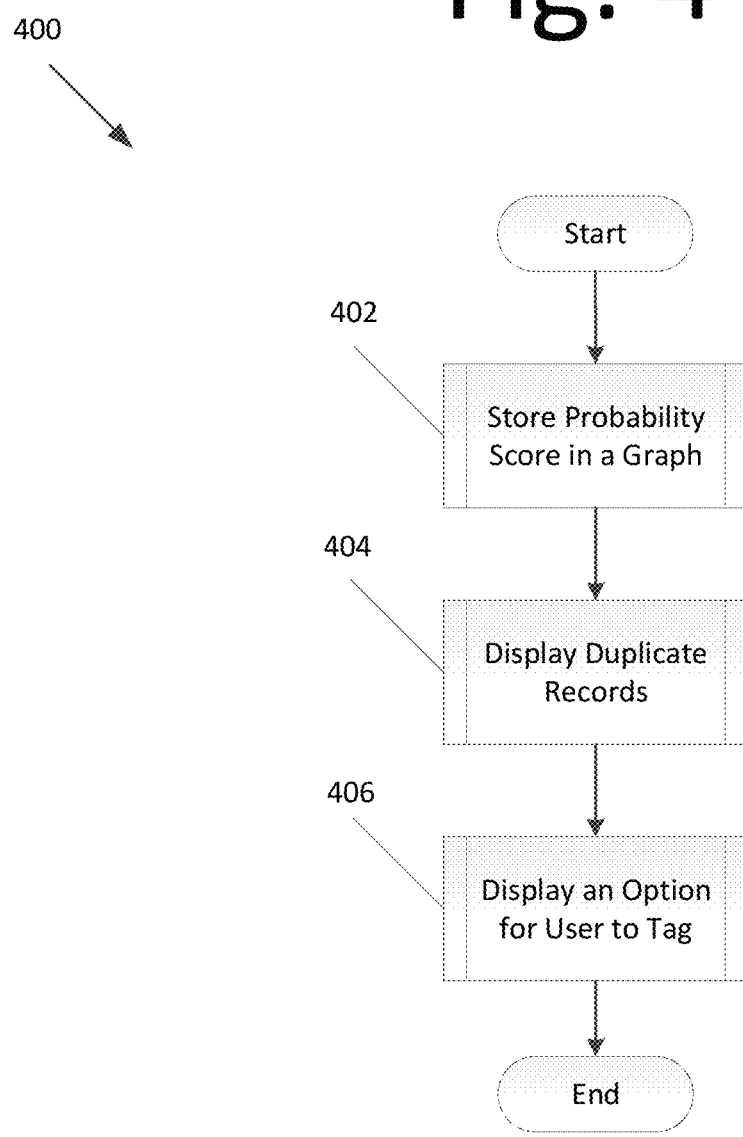
FIG. 4 is a flow diagram illustrating a method for displaying duplicate records to a user of the computing system, according to an embodiment of the present invention.

FIG. 4 is a flow diagram illustrating a method 400 for displaying duplicate records to a user of the computing system, according to an embodiment of the present invention. In an embodiment, method 400 may begin at 402 with the computing system storing the probability scores in a graph. These probability scores are stored as links between two vertices in a graph. The links provide a more efficient technique to store a relationship between two vertices and provide a faster way to extract duplicates for a record. At 404, the computing system displays the duplicate records. The duplicate records may be displayed automatically or when a user requests for the duplicate records, e.g., when the user clicks on the duplicate record tab. This way, duplicate records may be extracted from the graph and shown to the user in a more efficient manner. At 406, the computing system provides the user with an option to tag one or more duplication records as non-duplicates. In an additional embodiment, the computing system considers the duplicate records, which are merged by the user as duplicates, and pushes the duplicated records into the ML model for retraining purposes. In an alternative embodiment, depending on the user's response for marking as non-duplicates, the computing system pushes the user response regarding the records into the ML model for retraining purposes.

It should be appreciated that the method for deduplicating records in a database is broken into three phases, which are described in more detail below.

Cleaning and Transliteration of Fields

In some embodiments, during the cleaning process, the computing system removes punctuation, number, salutation and the like. Further, the computing system changes one or more character strings from uppercase to lowercase. The computing system may additionally remove stop words such as Company, PVT, LTD, Corp., Enterprise, LLC, Inc., etc. Other stop words that may be removed include, but are not limited to, common domains in email addresses, common email addresses for sales, support, and admin.

After removing stop words, the remaining string in the record are transliterated. In an embodiment, non-English languages by presence of Unicode characters in the string are detected and transliterated into English using a 1-to-1 mapping of non-English Latin and Cyrillic characters, which transliterate into English. This way, similarities between non-English records and English records are found.

Blocking

Scaling deduplication in a database for millions of records is challenging. For instance, duplicity between each pair of records in a database to identify similar records is needed. Let's use an example where there are 10,000 records in the database. In this example, at least 49,995,000 unique pairs must be searched. Now, let's imagine a larger database with millions of records! This drastically increases the computational time and cost.

In some embodiments, by implementing a blocking technique, the computing system look at only certain pairs of records rather than looking all pairs of the records. The assumption behind this technique is that any two duplicate records may have at least one common value between them. With this assumption, if the blocks (or groups of records) are created based on these common values, then only those records that are inside the blocks are compared. If the blocks are well constructed, then the blocks reduce the comparison time by a large margin. The blocks also help in solving the problem of non-duplicates.

Tokenization

To create a block, records are tokenized. By grouping all records to a token, a block is created. It should be appreciated that there are different methods to create a token. For example, a token may be created based on the fields of the records such as name, phone numbers or company names. Tokens can also be created based on parts of every word such as 2 letters, 3 letters or n letters of every word. These words are called n-grams. In one example, if the token is 'Smith', then any record which contains 'Smith' after tokenization will be grouped under this token. Because some words are common, there is a threshold on the size of the blocks. Otherwise, the block size increases and the pairwise comparisons become expensive and defeats the whole objective of creating blocks.

Figure 5:
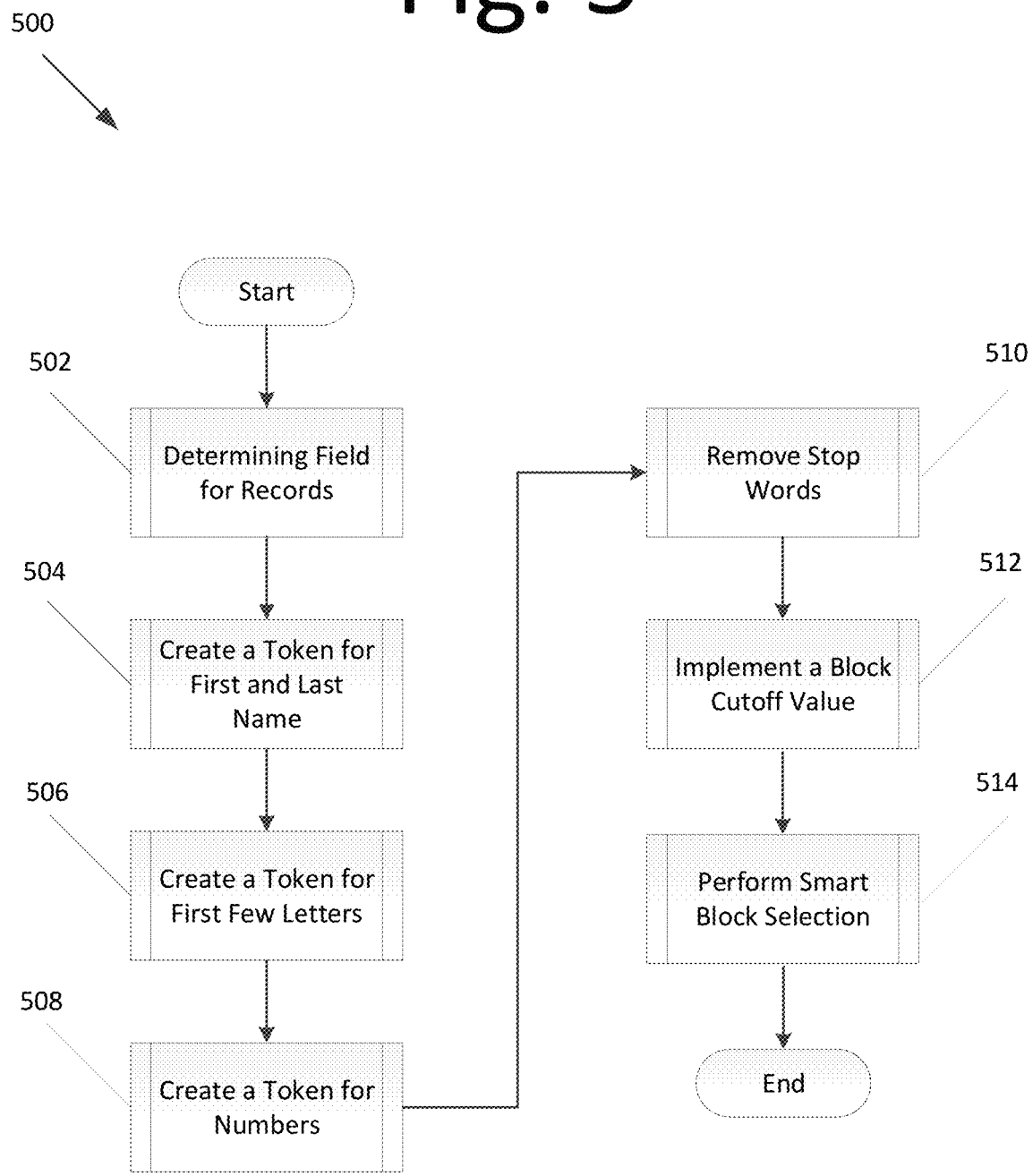
FIG. 5 is a flow diagram illustrating a method for creating one or more blocks, according to an embodiment of the present invention.

FIG. 5 is a flow diagram illustrating a method 500 for creating one or more blocks, according to an embodiment of the present invention. In an embodiment, method 500 begins at 502 with the computing system determining the fields for the records stored in the database. The fields may include first name, last name, company name, work number, mobile number, phone number, email, etc. Next, at 504, the computing system creates a token for the entire first name and last name after removing salutations and punctuations and also after changing the character string from upper case to lower case. This way, the name Mr. John and john would have the same token—john. The computing system at 506 also creates a token on the first few (e.g., five) letters of the names. This way, for each field, the computing system creates a token on the first five letters of the text in the field. For example, the text "Freshworks" and the text "Freshwrk" would have the same token since the first five letters are the same.

The computing system at 508 also creates another token for numbers, i.e., the last six digits of the numbers. For example, to ensure that the number +91 697 232 1232 and 697 232 1232 are on the same block, the last six digits are considered. This way, the state and country code do not affect block formatting.

At 510, the computing system also removes stop words for company names such as Inc., LLC, etc. At 512, the computing system implements a block cutoff value of 50, for example. For example, if there is a common name, such as John or Mike, the block will not be formed based on that token. At 514, the computing system perform smart block selection. For instance, after implementing a block cutoff, some blocks, which were larger in size (e.g., included a high number of record IDs) had a lower probability of containing record pairs that were duplicates than the blocks that were more unique (e.g., smaller in size).

ML Model

In some embodiments, an ML based algorithm learns the non-linearity of patterns and the threshold of features to distinguish a pair of records as duplicates or non-duplicates. In an embodiment, a random forest model may capture the nonlinearity and may solve the problem of overfitting, i.e., the random forest model (the "ML model" or a set of rules) is not too specific to the patterns in the training data but can still distinguish records in a much more generic way. The ML model may find duplicates even when there are spelling mistakes, phonetic matches, empty fields, punctuation, salutations, field mismatches, abbreviations, variations on phone numbers (e.g., state code, area code etc.). For example, for a phonetic match, similar sounding names but with different spellings (e.g., Catherine vs Kathryn) are selected by including the sounds as a sequence of letters, allowing the ML model to match them.

To solve the problem of having tagged data, a semi active learning technique is employed. In the semi active learning technique, data is tagged based on a matching criterion on the emails of two records. Once the ML model is trained on this data, the model predicts on a different test set. This is manually curated and fused with the training data for retraining the model. The aim is to feed those patterns for both duplicates and non-duplicates into the model, which otherwise might have been missed out using the heuristic.

Figure 6:
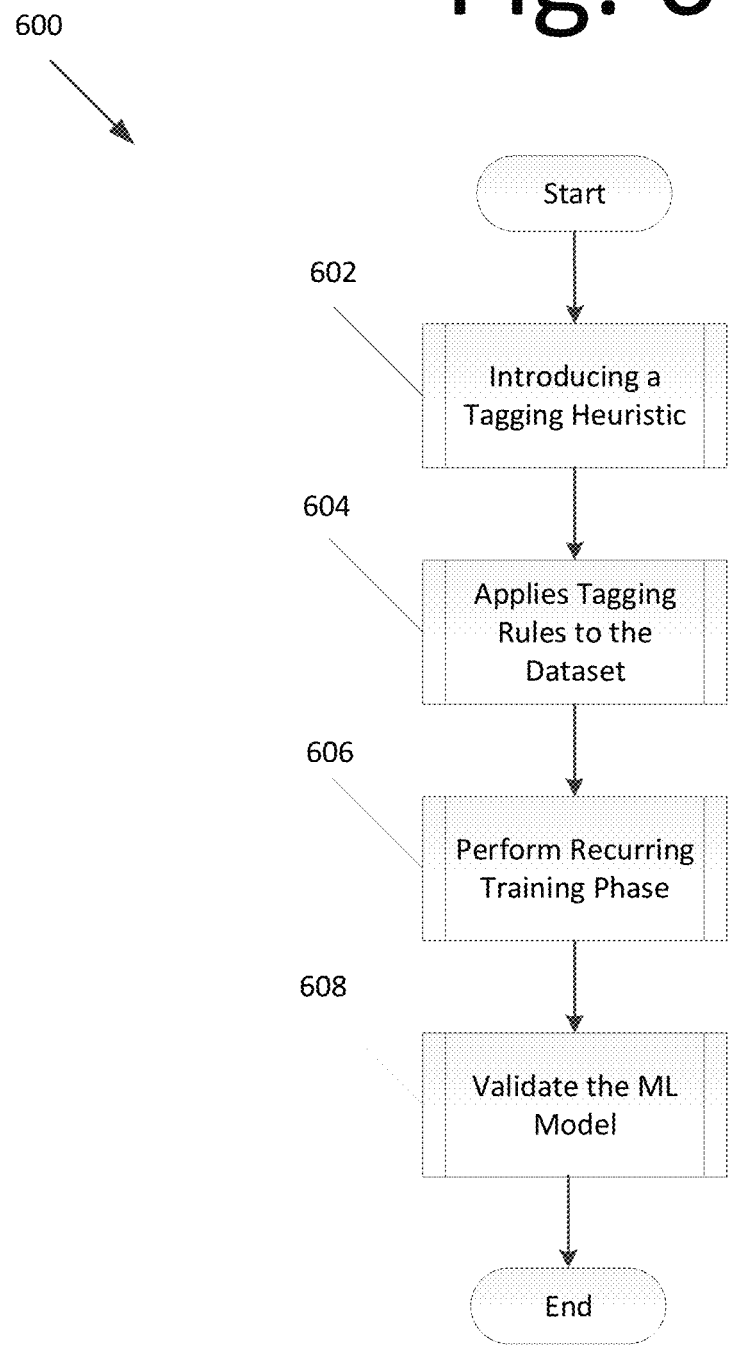
FIG. 6 is a flow diagram illustrating a method for building, training and validating a dataset, according to an embodiment of the present invention.

FIG. 6 is a flow diagram illustrating a method 600 for building, training and validating a dataset, according to an embodiment of the present invention. Because the dataset is not a golden dataset in so far that the dataset is not peer-reviewed and validated by clinical and coding experts, method 600 begins at 602 with the computing system introducing a tagging heuristic.

At 604, the computing system applies tagging rules to the dataset. For example, if emails of two records match, then the emails are tagged as a duplicate pair. Otherwise, if the emails of the two records do not match, then the computing system introduces the emails as non-duplicate pairs.

One problem with heuristics is that pairs with different emails might be very different while pairs with the same emails might be very similar. The differentiation learned by the ML model is as follows. The prediction where the records are slightly different and still are not non duplicates will not be as expected. Hence, the tagging is performed on pairs of records generated within the blocks.

At 606, the computing system performs a recurring training phase for the ML model. In some embodiments, the ML model is trained using a tagging mechanism. Furthermore, tests are performed on the ML model using a different set of data to identify those pairs of records where the predictions are incorrect due to tagging. This allows the tags to be corrected. The records are then passed into the training dataset to retrain the ML model.

In one example, when the data is tagged based on a heuristic, the pairs may be duplicates but the tags are the opposite. In those examples, when the ML model is trained on this kind of dataset, the weights the ML model learns on the different features and the patterns the ML model picks up might not be correct. For this reason, the predictions might be incorrect for some test dataset.

With active learning, test data is passed to a user of the computing system who looks at the pairs manually and tags them. This removes the dependency on the heuristic. When this user curated data is fed into the ML model and retrained, the weights learned on the features are much more reliable, ensuring that the tags are correct.

At 608, the computing system validates the ML model. In this embodiment, the computing system uses the area under the curve (AUC) to measure the predictive power of the random forest model. The computing system also determines the average rank. For example, in a test dataset, and for a given duplicate pair, the computing system determines if the ML model, for one of the records, places the other record as high as possible in terms of the prediction scores calculated on all other records. The computing system also determines the average false positive rate for the random forest model. By using the average false positive rate, the prediction scores should be low based on the threshold.

In some embodiments, a manual validation may be performed. By using a manual validation technique, a list of cases of duplicates and non-duplicates are maintained. This list is used to confirm that the random forest model identifies the duplicates and non-duplicates. Further, this list may be curated based on business needs.

Figure 7:
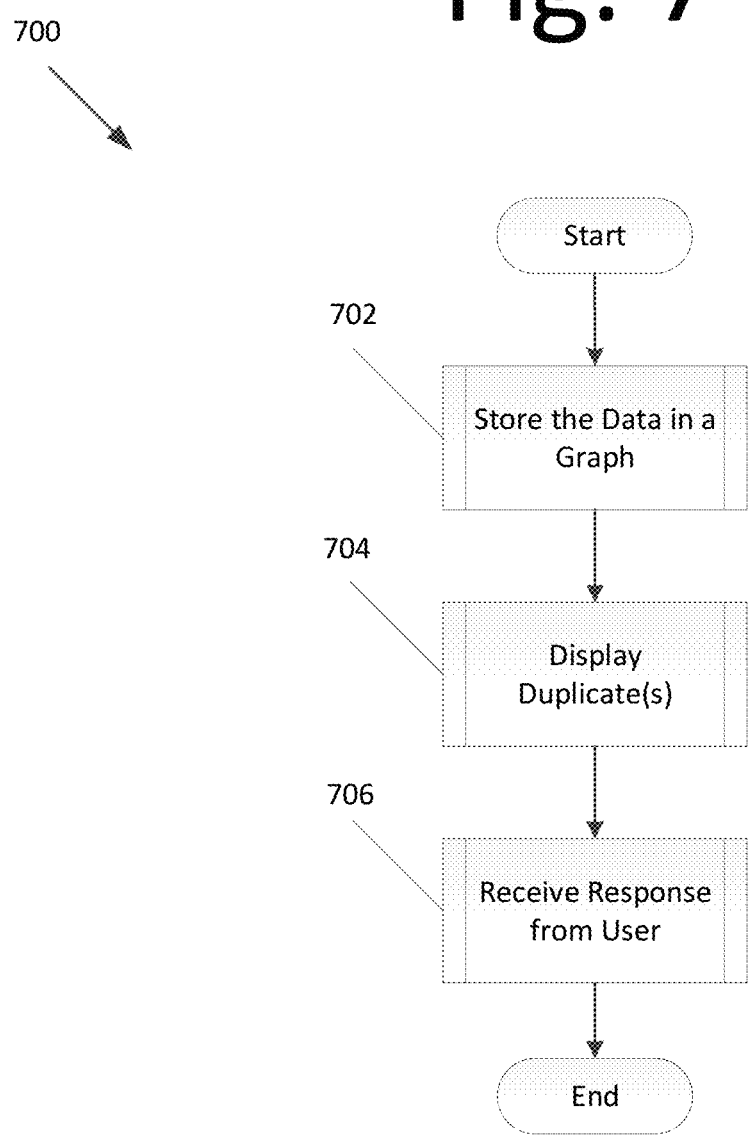
FIG. 7 is a flow diagram illustrating a method for storing a graph and showing the duplicated records to the user of the computing system, according to an embodiment of the present invention.
Figure 8:
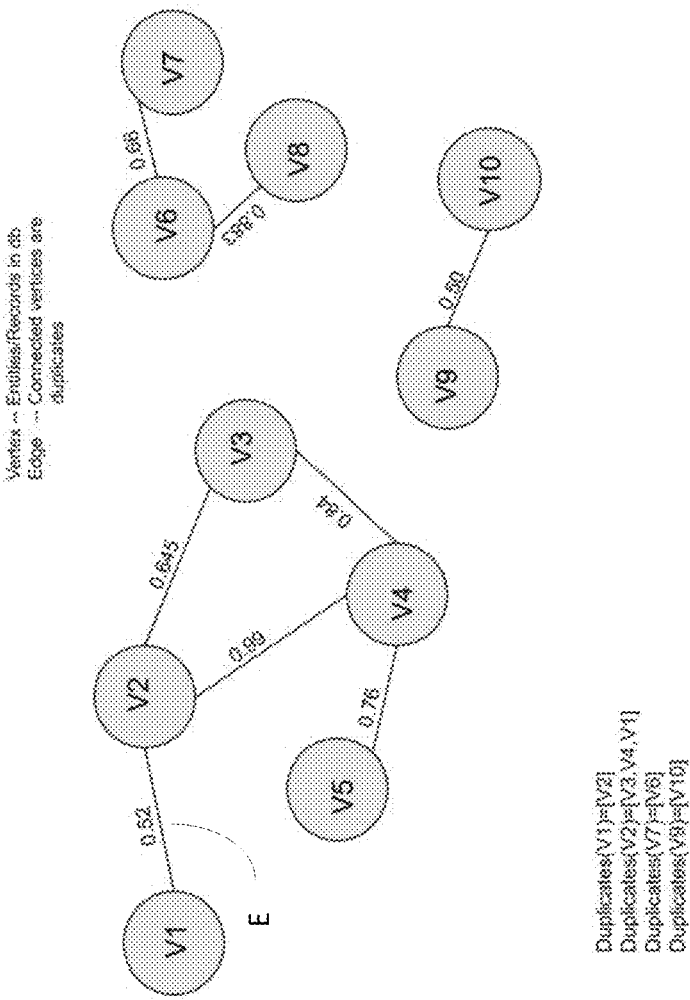
FIG. 8 is a graph illustrating vertices and edges, according to an embodiment of the present invention.

FIG. 7 is a flow diagram illustrating a method 700 for storing a graph and showing the duplicated records to the user of the computing system, according to an embodiment of the present invention. In some embodiments, the computing system may begin at 702 with storing the data in a graph. In an embodiment, vertices and edges are stored in the graph. See, for example, FIG. 8, which is a graph 800 illustrating vertices V1 . . . V10 and edges, according to an embodiment of the present invention. As shown in FIG. 8, a vertex (e.g., V1) may represent a record in the database, which has one or more duplicates, and an edge E between two vertices (e.g., V2 and V4) stores the score predicted by the ML model. This edge may represent the strength of a duplicate pair.

Returning to FIG. 7, the computing system displays one or more duplicates to the user of the computing system at 704. In an embodiment, to fetch duplicates of a particular record, the computing system queries the graph using a record ID to retrieve the connected vertices. Because the vertices are uniquely identifiable, duplicates of the particular record are fetched in constant time. The edge ID may encode the IDs of the two vertices it is connecting. This helps fetch the duplicate record from the edge ID without actually retrieving the connected vertex. While showing duplicates to the user, stronger duplicates are shown on top. To accomplish that, the duplicates are sorted based on the ML model score before displaying. Since the score is stored in the edge itself, it helps fetch the strongest duplicates at the time of the querying.

At 706, the computing system may receive a response from the user. The response includes tags, which includes conversion of duplicate records to non-duplicate records. In certain embodiments, there is also a mechanism that takes in those pairs, which were merged by the users as duplicates. The computing system may use this feedback dataset to retrain the random forest model. This way, the random forest model is actively learning.

The process steps performed in FIGS. 2-7 may be performed by a computer program, encoding instructions for the processor(s) to perform at least part of the process(es) described in FIGS. 2-7, in accordance with embodiments of the present invention. The computer program may be embodied on a non-transitory computer-readable medium. The computer-readable medium may be, but is not limited to, a hard disk drive, a flash device, RAM, tape, and/or any other such medium or combination of media used to store data. The computer program may include encoded instructions for controlling processor(s) of a computing system (e.g., processor(s) 110 of computing system 100 of FIG. 1) to implement all or part of the process steps described in FIGS. 2-7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, the appearances of the phrases "in certain embodiments," "in some embodiments," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with the embodiment is included in at least one embodiment of the present invention. Thus, discussion of the features and advantages, and similar language, throughout this specification may, but do not necessarily refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for deduplicating records, comprising:
   generating, by the computing system, a block, wherein the block comprises of a group of records;
   creating, by the computing system, one or more record pairs from the block;
   calculating, by the computing systems, one or more features based on one or more fields within the one or more record pairs;
   inputting, by the computing system, the one or more features into a machine language trained model to predict a probability score, wherein the probability score indicates whether two records are duplicates;
   storing, by the computing system, the probability score as links between two vertices in a graph, wherein the graph comprises a plurality of vertices representing a record in a database and a single edge connecting two vertices in the plurality of vertices, the single edge includes the probability score for the two vertices being a possible duplicative pair;
   displaying, by the computing system, one or more duplicate records by querying the graph;
   manually validating and curating, by a user, the probability score of the single edge and feeding the curated score into the machine language trained model to ensure that the probability score is accurate; and
   removing or de-duplicating two or more of the plurality of vertices based on the probability curated score.

2. The computer-implementing method of claim 1, further comprising:

cleaning, by the computing system, one or more records in the group of records, wherein
the cleaning of the one or more records comprises removing punctuation, number, salutation, changing one or more character strings from uppercase to lowercase, and removing one or more stop words.

3. The computer-implementing method of claim 2, the cleaning of the one or more records comprises transliterating one or more strings in the record into a predetermined language.

4. The computer-implemented method of claim 1, wherein generating of the block comprises creating the block based on one or more common values.

5. The computer-implemented method of claim 4, wherein the creation of the block comprises tokenizing the group of records.

6. The computer-implemented method of claim 5, further comprising:
creating, by the computing system, a token based on one or more fields in the group of records.

7. The computer-implemented method of claim 1, further comprising:
learning, by the computing system, non-linearity of patterns and thresholds of features to distinguish a pair of records as duplicates or non-duplicates.

8. A computer program embodied on a non-transitory computer readable medium, the computer program configured to cause a processor to:
generate a block, wherein the block comprises of a group of records;
create one or more record pairs from the block;
calculate one or more features based on one or more fields within the one or more record pairs;
input the one or more features into a machine language trained model to predict a probability score, wherein the probability score indicates whether two records are duplicates;
store the probability score as links between two vertices in a graph, wherein the graph comprises a plurality of vertices representing a record in a database and a single edge connecting two vertices in the plurality of vertices, the single edge includes the probability score for the two vertices being a possible duplicative pair;
display one or more duplicate records by querying the graph;
manually validate and curate the probability score of the single edge inputted by a user and feeding the curated score into the machine language trained model to ensure that the probability score is accurate; and
removing or de-duplicate two or more of the plurality of vertices based on the probability curated score.

9. The computer program of claim 8, wherein the computer program is further configured to execute the processor to
clean one or more records in the group of records, wherein the cleaning of the one or more records comprises removing punctuation, number, salutation, changing one or more character strings from uppercase to lowercase, and removing one or more stop words.

10. The computer program of claim 9, wherein the computer program is further configured to execute the processor to transliterate one or more strings in the record into a predetermined language.

11. The computer program of claim 8, wherein the computer program is further configured to execute the processor to create the block based on one or more common values.

12. The computer program of claim 11, wherein the computer program is further configured to execute the processor to tokenize the group of records.

13. The computer program of claim 12, wherein the computer program is further configured to execute the processor to create a token based on one or more fields in the group of records.

14. The computer program of claim 8, wherein the computer program is further configured to execute the processor to learn non-linearity of patterns and thresholds of features to distinguish a pair of records as duplicates or non-duplicates.

15. A system, comprising:
at least one processor; and
memory comprising a set of instructions, wherein the set of instructions are configured to cause the at least one processor to:
generate a block, wherein the block comprises of a group of records;
create one or more record pairs from the block;
calculate one or more features based on one or more fields within the one or more record pairs;
input the one or more features into a machine language trained model to predict a probability score, wherein the probability score indicates whether two records are duplicates;
store the probability score as links between two vertices in a graph, wherein the graph comprises a plurality of vertices representing a record in a database and a single edge connecting two vertices in the plurality of vertices, the single edge includes the probability score for the two vertices being a possible duplicative pair;
display one or more duplicate records by querying the graph;
manually validate and curate the probability score of the single edge inputted by a user and feeding the curated score into the machine language trained model to ensure that the probability score is accurate; and
remove or de-duplicate two or more of the plurality of vertices based on the probability curated score.

16. The system of claim 15, wherein the set of instructions are further configured to cause the at least one processor to clean one or more records in the group of records, wherein the cleaning of the one or more records comprises removing punctuation, number, salutation, changing one or more character strings from uppercase to lowercase, and removing one or more stop words.

17. The system of claim 16, wherein the set of instructions are further configured to cause the at least one processor to transliterate one or more strings in the record into a predetermined language.

18. The system of claim 15, wherein the set of instructions are further configured to cause the at least one processor to create the block based on one or more common values.

19. The system of claim 18, wherein the set of instructions are further configured to cause the at least one processor to tokenize the group of records.

20. The computer program of claim 19, wherein the set of instructions are further configured to cause the at least one processor to create a token based on one or more fields in the group of records.

21. The computer program of claim 15, wherein the set of instructions are further configured to cause the at least one processor to learn non-linearity of patterns and thresholds of features to distinguish a pair of records as duplicates or non-duplicates.

\* \* \* \* \*